Patented July 13, 1948

2,445,252

UNITED STATES PATENT OFFICE 2,445,252

PHOTOGRAPHIC ELEMENTS CONTAINING URETHANES OF N-SUBSTITUTED J ACIDS AS COLOR FORMERS

Vsevolod Tulagin, Phillipsburg, N. J., assignor to General Aniline & Film Corporation, New York, N. Y., a corporation of Delaware No Drawing. Application April 10, 1947, Serial No. 740,726

7 Claims. (Cl. 95—6)

The present invention relates to color photography and more particularly to the preparation of dye images in a photographic element while utilizing in either the photographic emulsion or the developer a derivative of J acid as a color former.

It is well known in the art that one of the commonest and best methods for producing dyestuff images in photographic silver halide emulsions is that known as color forming development. This process is predicated upon the utilization of a compound containing either a phenolic hydroxyl group or a reactive methylene group to couple with the oxidation products of a primary aromatic amino developer to produce in situ with the silver image formed on development of a quinoneimine or azomethine dyestuff.

J acid and its derivatives are widely employed as dye intermediates, particularly in the preparation of azo dyes. J acid has the following formula:

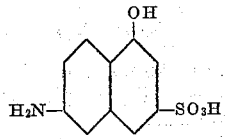

J acid in possessing a phenolic hydroxyl group is of the type which is capable of forming quinoneimine dye images by color forming development. J acid and its derivatives, particularly the N-aryl and acyl derivatives, are characterized by the fact that they are capable of producing deeply colored dyes of high tinctorial strength. Because of this property and their ability to form quinoneimine dyes, these compounds would normally recommend themselves for use in color photography as color formers.

Unfortunately, however, J acid itself and its N-aryl derivatives, are not sufficiently stable from a chemical standpoint to resist the bleaching or oxidizing baths employed to remove metallic silver in the processing of color film. Thus, experience has shown that dyes derived therefrom by color forming development upon being subjected to the usual bleaching baths such as a ferri-cyanide solution, are oxidized to yellow-brown dyes whereby color distortion inevitably ensues.

The best dyes of the series produced with the J acids are those obtained from the N-aryl derivatives. The N-aryl derivatives, however, are relatively easily oxidized especially in the presence of alkalies. Inasmuch as the usual photographic developing baths are alkaline, this further disadvantage militates against the employment of the N-aryl derivatives as color formers for use in photographic developers. Furthermore, when color formers are utilized in the photographic emulsion, it is accepted practice to disperse them in the colloid carrying the silver halide in an alkaline medium. Here again the instability of the compounds to alkali poses a difficult problem.

The acyl derivatives of J acids possess sufficient chemical stability to be employed as color formers in color photography. However, experience has again shown that the introduction of the acyl group into the J acid molecule has a very undesirable effect on the transmission spectra of the dyes obtained therewith. To date, then, there has been little interest shown in the employment of the J acids and their known derivatives in color photography despite the very desirable characteristic possessed by such compounds of yielding deeply colored dyes of high tinctorial strength.

It has now been discovered that the urethanes of N-aliphatic or N-aromatic J acids possess all of the desirable characteristics of J acid or its known derivatives without their attendant disadvantages. For instance, the urethanes are soluble and when provided with a long aliphatic chain as a substituent on the nitrogen atom thereof, they are non-diffusing in photographic emulsions. Furthermore, they are of sufficient stability to be incorporated either into a photographic emulsion or in the developer notwithstanding the alkaline nature of such compositions. Finally, the urethanes are not adversely affected by the ferricyanide bleaching solutions used to dissolve metallic silver in normal color film processing so that the dyes prepared therewith are not altered in hue or color in the processing of the film.

It is accordingly an object of the present invention to utilize in the formation of color images in color photography, urethanes of J acid.

It is a further object of the present invention to provide photographic silver halide emulsions containing as a color former, urethanes of J acid which are non-diffusing in the emulsion.

A further object of the present invention is to provide for use in color photography as a color former for the dyestuff images therein, urethanes of J acid containing as a substituent on the nitrogen atom of the J acid an aliphatic chain.

A further object of the present invention is color photographic elements containing new quinoneimine dye images in which the dyestuff is produced by the use of an N-aliphatic or an N-aromatic urethane of J acid as the color forming component.

Other and further important objects of the invention will become apparent as the description proceeds.

The compounds, the utilization of which is contemplated herein, may be depicted by the following formula:

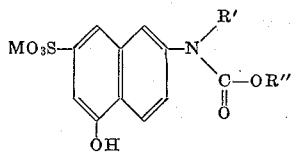

in which R' is an aliphatic radical such as alkyl, i. e., methyl, ethyl, propyl, butyl, amyl, and the like, alkoxyalkyl such as methoxymethyl, ethoxyethyl and the like, chloralkyl such as chlormethyl, chlorethyl and the like, hydroxyalkyl such as hydroxyethyl and the like, hydroxy polyethenoxy, sulfoalkyl such as sulfoethyl and the like, carboxyalkyl such as carboxyethyl and the like, aralkyl such as benzyl and the like, or an aromatic radical, such as phenyl, naphthyl, chlorophenyl, alkoxyphenyl, such as methoxyphenyl, ethoxyphenyl and the like, alkylphenyl such as toluyl, and the like, sulfophenyl, carboxyphenyl and the like, R'' is alkyl, such as methyl, ethyl, propyl, butyl, amyl, octyl, dodecyl, tetradecyl, hexadecyl, octadecyl and the like and M is hydrogen or a salt-forming radical such as an alkali metal, ammonium or an organic base such as pyridine, quinoline and the like.

It has been found that best results are obtained when the urethanes are employed in the silver halide emulsion rather than in the developer. When so used, it is imperative that the urethanes do not migrate from the emulsion layer in which they are located. In this connection, it is to be noted that inasmuch as the urethanes possess a nuclear hydroxyl group, they produce dyes of the cyan type and will accordingly be located in the red-sensitive layer. In order to prevent diffusion of the urethanes from the emulsion in which they are located, it has been found preferable to utilize compounds in which R'' is an aliphatic radical containing at least 12 carbon atoms such as dodecyl, tetradecyl, octadecyl, hexadecyl and the like.

Examples of compounds which I have found to be suitable for my purpose are:

1. 2-hexadecyl urethane of phenyl J acid
2. 8-pentadecyl urethane of p-chlorophenyl J acid
3. Octadecyl urethane of β-hydroxyethyl J acid
4. Tetradecyl urethane of β-chlorethyl J acid
5. Dodecyl urethane of β-sulfoethyl J acid
6. Dodecyl urethane of β-carboxyethyl J acid
7. Dodecyl urethane of benzyl J acid
8. 2-heptadecyl urethane of β-naphthyl J acid
9. Octadecyl urethane of methoxymethyl J acid
10. 2-nonadecyl urethane of p-tolyl J acid
11. Hexadecyl urethane of hydroxy polyethenoxy J acid in which the polyethenoxy group contains 6 carbon atoms
12. 2-eicosyl urethane of p-anisyl J acid
13. Tetradecyl urethane of p-anisyl J acid
14. Octadecyl urethane of p-anisyl J acid
15. Dodecyl urethane of phenyl J acid
16. Tetradecyl urethane of phenetyl J acid
17. Octadecyl urethane of p-chlorophenyl J acid
18. Tetradecyl urethane of p-anisyl J acid
19. Octadecyl urethane of methyl J acid The urethanes which we propose to employ as color formers are produced by subjecting an N-aromatic J acid or an N-aliphatic J acid to the action of long chain alkyl chlorocarbonate at low temperatures, preferably ranging from about 5 to 35° C. Desirably the reactants are vigorously agitated during the reaction. The desired low temperature is maintained by external cooling. Inasmuch as hydrochloric acid is split off in forming the urethane, an acid binding agent should be present and this may be either an inorganic acid binding agent such as sodium hydroxide, potassium hydroxide, sodium acetate and the like, or an organic binding agent such as pyridine, quinoline or the like. Where an inorganic acid binding agent is used, and particularly if a low molecular weight chloroformate is employed, such as methyl, ethyl or the like chloroformate, the reaction is effected in an aqueous medium. On the other hand, where a high molecular weight chloroformate is employed such as dodecyl chloroformate, or octadecyl chloroformate, it is preferable to work with an organic acid binding agent in an organic solvent such as dimethyl formamide.

As previously stated, the urethanes containing a long aliphatic chain, preferably having at least 12 carbon atoms, are utilized in a photographic silver halide emulsion. In order to incorporate the urethanes in the emulsion, 1 gram of a color former is dissolved in 7 cc. of ethyl alcohol. The solution is then diluted with distilled water, neutralized with sodium hydroxide, and added to the emulsion. This is the procedure which is followed in incorporating the color formers in the emulsions in the subsequent examples.

The following examples will serve to illustrate the invention, the parts being by weight unless otherwise stated. These examples, however, are illustrative only.

*Example I*

To a solution of 20 parts of highly purified anhydrous pyridine salts of phenyl J acid in 100 volumes of dimethyl formamide containing 8 parts of pyridine, are added 17.5 parts of octadecyl chloroformate at 10° C. The mixture is agitated during the addition and maintained at 10° C. by external cooling. After 4 hours at 10° C., an additional 8 parts of pyridine and 17.5 parts of octadecyl chloroformate are added and the mixture is stirred at 10° C. for another 4 hours. The mass is then stirred at room temperature for 16 to 20 hours.

The resulting suspension is treated with 250 volumes of benzene and stirred for ½ hour. The phases are separated and the lighter, larger layer is freed from suspended material by filtration through a layer of diatomaceous earth. The filtrate is evaporated to dryness. The residue is extracted with two 300 volume portions of low-boiling petroleum ether. The resulting yellow solid is dried and dissolved in a minimum quantity of hot benzene. A small amount of insoluble material is removed by filtration and the filtrate is maintained for 1 hour at 5 to 6° C., whereupon the octadecylurethane of phenyl J acid crystallizes as the pyridine salt in the form of plate-like crystals. The substance is cooled and dried. It may be further purified by crystallization from alcohol and water.

To 100 cc. of a photographic silver halide emulsion there are added .5 gram of the octadecyl urethane of phenyl J acid. The emulsion is then coated on a transparent film support and dried. After exposure, the film is developed in a color forming developer comprising

| | Parts |
|---|---|
| Water | 1000 |
| Sodium sulfite | .5 |
| p-Diethylamino aniline | 2.5 |
| Sodium carbonate | 70 |
| Potassium bromide | 2.5 |

A silver plus dye image is formed. After removal of the silver by bleaching in potassium ferricyanide solution and subsequent fixing, a deeply colored greenish-blue dye image remains.

If in lieu of the p-diethylamino aniline the development be effected with phenyl hydrazine, a bluish violet dye image of high intensity is formed.

*Example II*

To a suspension of 36 parts of pyridine salt of benzyl J acid in 200 volumes of dimethylformamide and 40 parts of pyridine, are added 30 parts of dodecyl chloroformate at 30° C. and the mixture is stirred at room temperature for 16 to 24 hours. The resulting suspension is heated to 80° C. to obtain complete solution and then cooled to 35° C. An addition of 30 parts of dodecyl chloroformate is added and the mixture is again stirred overnight.

The resulting mass is evaporated to dryness; the residue is extracted with low-boiling petroleum ether and the resulting emulsion is separated with the aid of a centrifuge. The lower emulsion layer is extracted with benzene and the hot extract is cleared of suspended matter by filtration through a layer of diatomaceous earth. The filtrate is evaporated to dryness and the residue is crystallized from a 50-50 mixture of dioxane and isopropyl ether (500 volumes). The total yield consists of 56 parts of the pyridine salt of dodecyl urethane of benzyl J acid.

.5 gram of the resulting product is dispersed in 100 cc. of a photographic silver halide emulsion as in Example I. After coating a transparent film support, drying and exposing the same, the film is developed in a color forming developer as in Example I. By removing the silver with potassium ferricyanide solution and subsequent fixing, a deeply colored beautiful cyan dye image is obtained.

*Example III*

Example I is repeated excepting that in place of phenyl J acid there is employed p-anisyl J acid. Images similar to those obtained in Example I result when the octadecyl urethane of p-anisyl phenyl J acid is utilized as the color former as in Example I.

*Example IV*

.5 gram of the lauryl urethane of p-chloro J acid obtained according to Example I while utilizing lauryl chloroformate and p-chlorophenyl J acid is dispersed in 100 cc. of a photographic silver bromide emulsion. After coating the emulsion on a transparent support, drying and exposing the same, the emulsion is developed in a developer of the type described in Example I. A cyan dye image of high tinctorial strength is thus obtained.

*Example V*

Example I is repeated while utilizing methyl J acid in place of phenyl J acid. The dyestuff images obtained while utilizing this urethane as the color former are similar to those of Example I.

*Example VI*

β-hydroxyethyl J acid (obtained by esterification of the hydroxyl group of J acid with, for instance, chloracetic acid, treatment of the resulting compound with ethylene oxide in an alkaline medium and then splitting off of the ester group) is substituted for the phenyl J acid of Example I. The dye images produced when incorporating the resulting urethane in a photographic silver bromide emulsion, as in Example I, are quinoneimines, cyan in color and of a high tinctorial power.

*Example VII*

To a suspension of 37 parts of phenyl J acid (commercial product of 81% purity) in 200 parts of water, are added 36 parts of 6N sodium hydroxide solution. The mixture is stirred for 15 minutes and then treated with 16 parts of hexadecyl chlorocarbonate. The mass is rapidly agitated and kept at approximately 5° C. by external cooling. After 15 minutes, 17 parts of 6N sodium hydroxide and 12 parts of hexadecyl chlorocarbonate are added and the mixture is stirred for another 15 minutes. A third portion of sodium hydroxide and hexadecyl chlorocarbonate is then added in the above manner. An oil separates out, which gradually becomes crystalline and is completely solid at the end of an hour of stirring. This substance is collected by filtration and dissolved in water. The solution is cooled to 30° C. and treated with a salt solution to incipient cloudiness. Upon cooling and seeding, the sodium salt of the hexadecyl urethane of phenyl J acid separates slowly as microscopic needles.

An exposed photographic silver bromide emulsion is developed in a color forming developer of the following compositions:

| | Parts |
|---|---|
| Water | 1000 |
| Sodium sulfite | .5 |
| p-diethylaminoaniline | 2.5 |
| Sodium carbonate | 70 |
| Potassium bromide | 2.5 |
| Ethyl urethane of phenyl J acid | 1.0 |

After bleaching with a ferricyanide solution and fixing, a cyan dye image of beautiful hue and intensity is obtained.

*Example VIII*

β-sulfoethyl J acid (obtained by reacting taurine with 6-amino-1-hydroxynaphthalene-3-sulfonic acid in the presence of an alkaline bisulfite) and lauryl chloroformate are substituted for the phenyl J acid and octadecyl chloroformate of Example I. The resulting urethane yields cyan dye images when utilized as a color former in photographic silver bromide emulsions as in Example I.

It is believed that the quinoneimine dyestuff images which are obtained according to the present invention have the following structural formula:

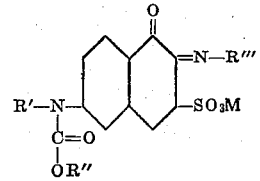

wherein M, R' and R" have the values given above and R''' is an aryl radical. Inasmuch as the urethanes are new compounds, the quinoneimine dyes obtained therewith are likewise new dyestuffs, as are photographic elements bearing such dyestuff images.

Various modifications of the invention will occur to persons skilled in the art. Thus, in lieu of utilizing as the developer p-dimethylaminoaniline, other aromatic polyamines may also be employed, such as p-phenylene diamine, p-diethylaminoaniline, and the like.

Similarly, in lieu of employing the color formers for the production of quinoneimine dyestuff images in the color forming development method, they may also be employed to produce azo dyestuff images by the silver dye bleaching method. Thus, a photographic emulsion containing one of the urethanes mentioned above and bearing a long aliphatic chain as a substituent, preferably one having at least 12 carbon atoms, is incorporated in a photographic silver halide emulsion in the ratio of 6 parts of the color former to 1 kilo of emulsion. The emulsion is then coated on a transparent film and the film exposed. After exposure, the film is developed in a black and white developer and is then bathed for a few minutes in a solution containing the tetrazo compound of benzidine-2.2'-disulfonic acid. A dyestuff is thereby evenly formed throughout the emulsion. The film is then treated in a conventional azo dye bleach bath to effect destruction of the dye at the silver image, whereupon the film is worked up according to the usual practice. A positive dyestuff image is thereby obtained in the film.

I claim:

1. The process of producing dyestuff images in an exposed photographic silver halide emulsion which comprises developing the emulsion with a primary aromatic amino developer in the presence of a urethane of J acid having the following formula:

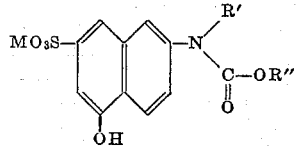

wherein R' is a member of the class consisting of an aliphatic radical and an aromatic radical, R" is alkyl, and M is a member selected from the class consisting of hydrogen and a salt-forming radical.

2. A photographic silver halide emulsion containing a color former fast to diffusion comprising a urethane of J acid having the following formula:

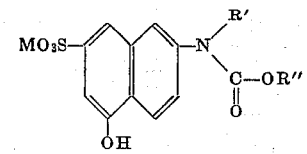

wherein R' is a member selected from the class consisting of aliphatic radicals and phenyl radicals, R" is an alkyl radical of at least 12 carbon atoms and M is a member selected from the class consisting of hydrogen and a salt-forming radical.

3. A photographic silver halide emulsion as defined in claim 2 wherein R' is a phenyl radical and R" is an alkyl radical of at least 12 carbon atoms.

4. A photographic silver halide emulsion as defined in claim 2 wherein R' is an aliphatic radical and R" is an alkyl radical of at least 12 carbon atoms.

5. A photographic silver halide emulsion as defined in claim 2 wherein R' is benzyl and R" is an alkyl radical of at least 12 carbon atoms.

6. A photographic silver halide emulsion containing as a color former fast to diffusion octadecyl urethane of phenyl J acid.

7. A photographic silver halide emulsion containing a color former fast to diffusion comprising dodecyl urethane of benzyl J acid.

VSEVOLOD TULAGIN.

REFERENCES CITED

The following references are of record in the file of this patent:

UNITED STATES PATENTS

| Number | Name | Date |
|---|---|---|
| 2,414,491 | Tulagin | Jan. 21, 1947 |